US006836294B2

(12) United States Patent
Miller et al.

(10) Patent No.: US 6,836,294 B2
(45) Date of Patent: Dec. 28, 2004

(54) METHOD OF DECREASING DELAY THROUGH FRAME BASED FORMAT CONVERTERS

(75) Inventors: Jon Scott Miller, East Greenville, PA (US); Kevin Stec, Medford, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 495 days.

(21) Appl. No.: 09/820,443

(22) Filed: Mar. 29, 2001

(65) Prior Publication Data

US 2002/0140852 A1 Oct. 3, 2002

(51) Int. Cl.$^7$ ............................ H04N 7/01; H04N 11/20
(52) U.S. Cl. ...................................... 348/458; 348/441
(58) Field of Search ................................ 348/441–459, 348/571, 575; H04N 7/01, 11/20

(56) References Cited

U.S. PATENT DOCUMENTS

| 5,430,486 A | * | 7/1995 | Fraser et al. ............. 348/426.1 |
| 5,485,215 A | * | 1/1996 | Meyer et al. ............. 348/423.1 |
| 5,526,051 A | * | 6/1996 | Gove et al. ............. 375/240.01 |
| 5,587,742 A | | 12/1996 | Hau et al. |

OTHER PUBLICATIONS

D. Wiswell, Panasonic's AJ–UFC1800 universal format converter, http://www.broadcastengineering.com/archives/0699/199906be27.html.
Specification and Features, Panasonic AJ–UFC1800 Universal Format Converter.
You Can't Change the World Without Making the News, http://www.pavcal.com/thenextrevolution/news/.
LF3330 Vertical Digital Image Filter, Logic Devices Incorporated, Aug. 16, 2000.
P. Schut, Aspect Ration Conversion Technology and Notation in a Difficult Process, Axon Digital Design.

* cited by examiner

*Primary Examiner*—Michael H. Lee
(74) *Attorney, Agent, or Firm*—RatnerPrestia

(57) ABSTRACT

An apparatus converts an input video signal having a first format into an output video signal having a second format. A formatter receives the first video signal and divides each field or frame into an active video top and bottom half. Two format converters receive and process the two halves of the active video images from the formatter and provide respective halves of the active video image for rejoining into the second format. A demultiplexer receives the two halves of the active video images from the two format converters and combines the active video upper and active video lower halves of the fields or frames into the output video signal having a second format.

14 Claims, 4 Drawing Sheets

METHOD OF DECREASING DELAY THROUGH FRAME BASED FORMAT CONVERTERS

FIELD OF THE INVENTION

The present invention relates to format converters and in particular to a system for converting television signals between first and second formats with minimal delay.

BACKGROUND OF THE INVENTION

Both analog and digital television signals are transmitted or stored in many different standard definition television (SDTV) formats. Analog television signals include three principal formats, NTSC, PAL and SECAM, each of which include one or more sub-formats. Digital television signals may be MPEG encoded or encoded according to the digital video (DV) standard. Each of these standards includes many different formats, having differing numbers of pixels per line, lines per field or frame and fields or frames per second. Thus, in addition to SDTV formats, digital television signals may be encoded in a number of high-definition television (HDTV) formats.

Television studios and, increasingly consumer television viewers, may receive television programming in many different formats. Television studios need to convert the programming into a format that is compatible with their viewers' equipment. For example, a studio in the United States may receive a Russian program in the SECAM format and need to convert it to NTSC format for transmission to its viewers. Television viewers, on the other hand, need to convert the programming to be compatible with their display devices. For example, a viewer may want to view, on a conventional NTSC television receiver, a program that is broadcast only in high-definition television (HDTV) digital format.

For either of these applications, a television signal in one format is converted into another format by a format conversion process. The process typically involves using scan conversion techniques to change the number of lines per picture, the number of samples per line and the encoding method for the color signals. The result is a television signal having the same content as the input signal but compatible with the desired output standard. It is, of course, desirable for the output signal of the format converter to have the same sharpness and color fidelity as the input signal. In some broadcast systems, timing requirements dictate that these conversions must be performed in less than one frame interval. Application specific integrated circuits (ASICS) have been built which can perform the high quality conversions that are required for these broadcast systems. One such system is described in U.S. Pat. No. 5,587,742 entitled FLEXIBLE PARALLEL PROCESSING ARCHITECTURE FOR VIDEO RESIZING. This system, as with many existing format conversion systems have a minimum delay of at least a one video frame time.

SUMMARY OF THE INVENTION

The present invention is embodied in a video format converter that exhibits a delay of less than one video frame time.

An exemplary method of expediting the conversion process is to split an input video stream among two or more format converters. A first portion of each video image is sent to one of the format converters while a second portion of the video image is sent to another format converter. Each format converter begins the conversion process as it receives its input video signal. Thus, the multiple converters operate in parallel. Each converter is synchronized with the other converters to provide its output signal at an appropriate time so that the composite output signal of the multiple converters is a single video signal. The total delay of this format conversion system is less than one video frame interval.

For a better understanding of these and other aspects of the invention, reference may be made to the following detailed description taken in conjunction with the accompanying drawings.

BRIEF DESCRIPTION OF THE DRAWINGS

This invention is described with reference to the following detailed description when considered in connection with the accompanying drawings in which like referenced numerals designate like parts throughout.

DETAILED DESCRIPTION OF THE EXEMPLARY EMBODIMENTS

Figure 1:
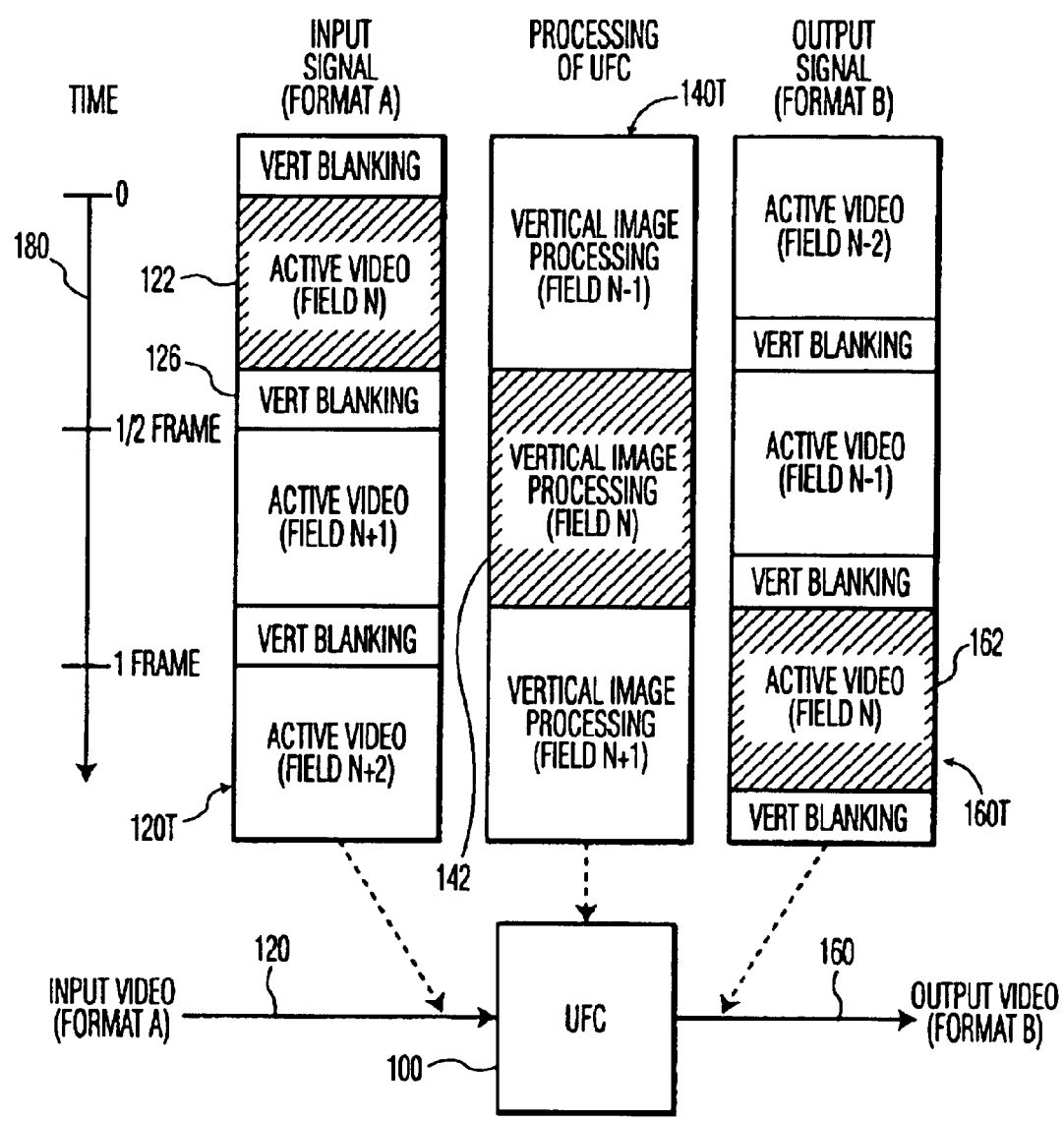
FIG. 1 is a block diagram of a conventional conversion system and three timing diagrams that are useful for describing its operation.

FIG. 1 shows a conventional format conversion system that uses a single format converter 100. The converter 100 may be, for example, a AJ-UFC1800 format converter which is available from Panasonic Broadcast and Television Systems Co. Alternatively, the format converter may be implemented using a video format converter integrated circuit such as the PV11000-VFC integrated circuit, manufactured by Panasonic Broadcast and Television Systems Co.

Within the format converter 100 a vertical interpolator (not shown) is used to interpolate lines between lines in the input signal to achieve a different number of lines in the output image than exist in the input image. In the same way, the format converter 100 includes a horizontal interpolator which interpolates picture element (pixel) samples at positions between the pixels of the input signal to provide a different number of samples on each line of the output signal than are provided on each line of the input signal. The format converter may be used, for example, to change a 480I digital television signal to a 1080I signal. In this mode, the format converter increases the 720 pixels on each line of the input signal to 1920 horizontal pixels on each line of the output signal and to convert 480 active lines on the input signal to 1080 active lines on the output signal. The interpolation technology provides a high degree of accuracy by using both spatial and temporal information. The spatial-temporal filtering process creates new, interpolated picture information rather than simply repeating the information already within the video signal, resulting in essentially no loss in picture resolution during the conversion process.

In FIG. 1 the system block diagram illustrates a format converter 100 having an input video signal 120, illustrated by the timing diagram, 120T. The signal processed by the format converter is illustrated by the timing diagram 140T.

The output signal of the format converter 100 is the signal 160, illustrated by the timing diagram 160T. The timing diagrams, 120T, 140T and 160T illustrate signal timing at different instants along a common time axis 180.

In FIG. 1, the input video signal 120 having a first format (format A), includes an active video field N 122. This signal is applied to the input port of the format converter 100. As shown in FIG. 1, the format converter 100 processes the input signal during the vertical image processing interval 142 for field N. This processing is delayed by one field interval from the application of the field N to the format converter 100. Immediately after format converter 100 completes the processing 142, an output video signal 160 having an active video signal 162 is provided in a second format (format B). The vertical time line 180 of FIG. 1 shows, that the minimum delay from the time when input video signal 120 enters the single format converter 100 to when the output video signal 160 emerges is one frame time (i.e. two field times) minus the vertical blanking interval 126 for one field.

Figure 2:
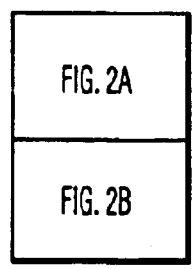
FIG. 2 is a block diagram of a system in accordance with a first embodiment of the present invention with eight timing diagrams that are useful for describing its operation.
Figure 2A:
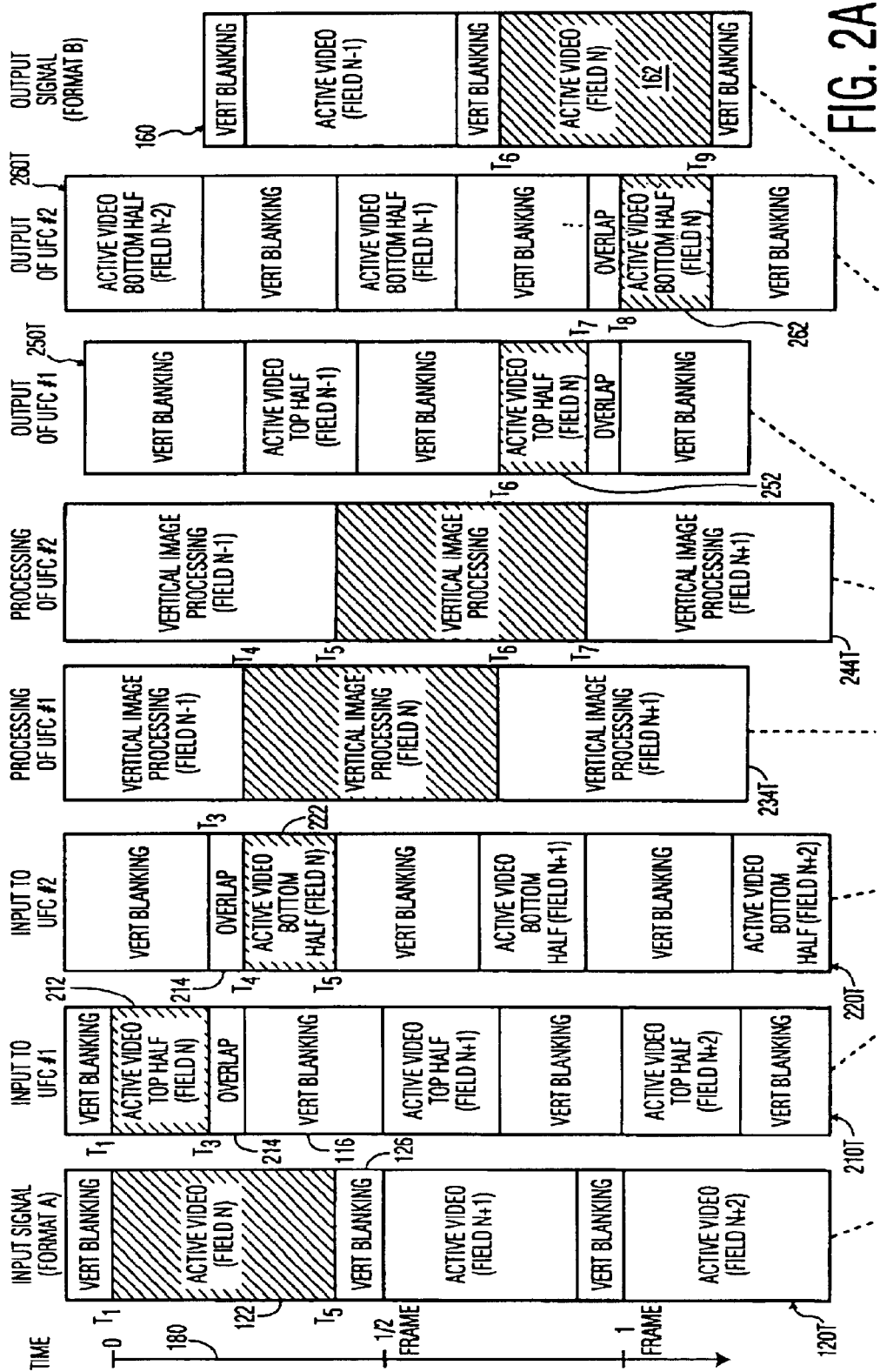
Figure 2B:
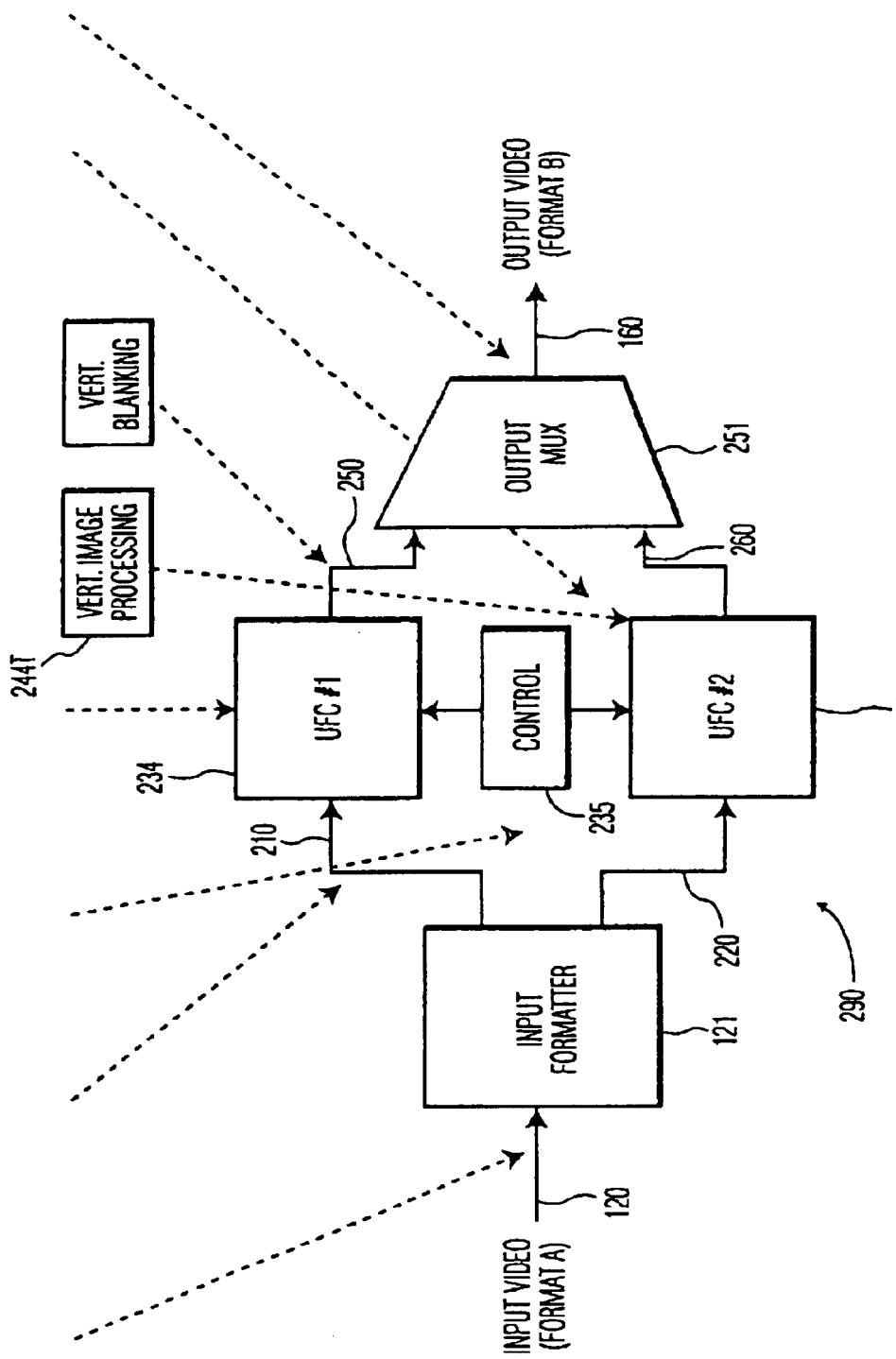

FIG. 2 illustrates an exemplary embodiment of the present invention comprising the two format converters 234 and 244 each processing one-half of the active video field 122. The exemplary converters 234 and 244 are coupled to a controller 235 that synchronizes the two controllers but otherwise allows each controller to process its respective half video field independently of the processing of the other converter. The embodiment shown in FIG. 2 reduces the delay time expended converting from the input video signal 120 into the output video signal 160. The system operates by applying the input video signal 120 to an input formatter 121 that splits each field of the input video signal into two overlapping half-fields 212 and 222. The two fields are processed by the respective format converters 234 and 244 to produce respective output signals 250 and 260. These signals are combined in an output multiplexer 251 to generate the output signal 160. In the exemplary embodiment of the invention shown in FIG. 2, the first video signal 210 includes the top half 212 of field 122 while the second video signal 220 includes the bottom half 222 of field 122.

In addition, the two half fields include two small overlap regions 214 and 224 which respectively correspond to the top half 212 and bottom half 222 of the field 122. These regions aid in combining the output signals from the two format converters 234 and 244 to produce the signal output signal 160, as described below. Overlap regions 214 and 224 are used to smooth the transition from first format converter 234 to the second format converter 244 so when the respective output signal 250 having a half-field portion 252 and output signal 260 having a half-field portion 262 are combined, there are no artifacts at the transition point in the center of the field 162 of the output video signal 160.

As described in more detail below, to reduce the visibility of any artifacts at this boundary, it is desirable for the starting phase of the vertical interpolator of the second format converter 244 to match the ending phase of first format converter 234. The first format converter 234 and second format converter 244 each process their respective half-field signals 212 and 222. Because the processing of the half-field signal 212 begins after only half of the field has been received, there is significant parallel processing of the respective half-fields by the format converters 234 and 244. This parallelism reduces the delay through the format conversion process so that, as the time line 180 shows in FIG. 2, the active video field 162 of output video signal 160 is offset by about three quarters of a frame from the active video field 122 of input video signal 120.

An NTSC video signal employs a total of 525 horizontal lines per frame, 486 of which include active image data. The remaining 39 line intervals are the vertical blanking interval. The examples shown in FIGS. 1 and 2 both show interlaced video signals. Standard interlaced television signals display each field (one-half of a frame) by scanning only alternate lines. Thus the odd fields display the odd numbered lines of the image frame and the even fields display the even numbered lines of the frame. The combination of an odd field and an even field is a frame.

The same procedure as shown in FIGS. 1 and 2 may be used to convert between progressively scanned signals in first and second formats. For example to convert between the 480P and 720P formats. The analysis is essentially the same except that all delays of vertical time axis 180 are doubled and the shaded regions of FIGS. 1 and 2 examples represent video frames rather than fields.

The methods described with reference to FIG. 2 may apply other types of processing than format conversion. The same analysis may be used for any video processing that has a nominal delay of one field interval or one frame interval. An example of such processing may be, for example, an interlaced-scan to progressive-scan conversion system or a two-dimensional low-pass filtering operation.

The exemplary format converters 234 and 244 are universal format converter which may be either stand-alone units or application specific integrated circuits (ASICs). The exemplary format converters each include a two dimensional interpolator for video data, however, many other types of processing devices could be inserted in place of the converters 234 and 244 that are used in the present embodiment of applicants' invention. It is desirable that any replacement for the format converters 234 and 244 meet two criteria. First, it is desirable that the device be able to output data during a vertical blanking period. Second, it is desirable that the device have a programmable starting phase.

With reference to the first requirement, the device, whether it is a format converter, interlace to progressive converter, low-pass filter or other device that operates on video fields or frames, has the capability to start releasing output data during the vertical blanking period 126 of the input video 120. Referring to FIG. 1 it is noted that the format converter 100 begins to send the output signal 160 having active video 162 for Field N immediately after the active video 124 of field N+1 in the input signal 120 is completed. If the device waited until after the end of the vertical blanking interval, to produce the active video 162 for field N, or until the start of field N+2 in the input signal 120, then there would be no decrease in format conversion delay by combining two converters. Referring again to FIG. 1, if the devices used in place of the format converter 100 satisfy the first criterion, then the minimum delay through the device is one frame interval minus the vertical blanking time 126 of the input video 120. Taking advantage of this, if the vertical blanking time 126 is increased, the conversion delay can be decreased. One way to extend the vertical blanking time 126 without increasing the length of a total frame is to make the active video area smaller.

FIG. 2 shows how this may be accomplished. The goal of making the active video area smaller is achieved without discarding any active video data by dividing active video interval 122 for field N into an active video top half interval 212 and active video bottom half interval 222 and sending the active video intervals 212 and 222 to the two format converters 234 and 244 respectively. It can be seen with time axis 180 that the delay through the overall system 290 is one frame interval minus the new vertical blanking time 216 for first format converter 234. One way in which the delay for the system 290 of FIG. 2 can be reduced is by splitting the active video area 122 in half and sending active video top half 212 to the first format converter 234 and the active video bottom half 222 to the second format converter 244. If less delay is desired, more format converters may be added to further split the active video area. The amount by which the delay is reduced, however, decreases with each added converter.

As shown in FIG. 2, the active video signal for frame N in the input signal 120 begins at time T1 and ends at time T5. The exemplary embodiment of the invention divides this active video signal into two intervals. A top half interval 212 begins at time T1 and ends at time T4. The bottom half interval begins at time T3 and ends at time T5. The input video signal occurring between times T3 and T4 is an overlap signal that is processed by both of the format converters 234 and 244, as described below.

As shown in the timing diagrams 234T and 244T, the format converter 234 processes the top half interval 212 between times T4 and T6 while the format converter 244 processes the bottom half interval 222 between times T5 and T7. Between times T6 and T8, the format converter 234 provides the converted top half interval 252 of field N in its output signal 250. Between times T7 and T9, the format converter 244 provides the converted bottom half interval 262 of field N in its output signal 260. The signal provided by both converters 234 and 244 between the intervals T7 and T8 is the overlap region, described below with reference to FIGS. 3 and 3A. The output signals 250 and 260 are combined by the multiplexer 251 to produce the converted field N between times T6 and T9.

Although the timing diagrams 120T, 210T, 220T, 234T, 244T, 250T, 260T and 160T show corresponding times as being coincident, it is contemplated that there may be some delay between corresponding times in the different timing diagrams to allow for signal propagation delay between the elements of the circuit shown in FIG. 2.

To ensure that the component images merge smoothly, it is desirable to have some area of overlap 214 and 224 between the video areas 212 and 222 processed by the converters 234 and 244. In the exemplary system shown in FIG. 2, each of the format converters 234 and 244 has a vertical filtering process within it which makes the overlap region desirable as described herein below. In general, the performance of any processor that may be substituted for the format converters 234 and 244 and which has a vertical processing element that uses pixels from multiple horizontal lines would be improved by including an overlap region. If, however, the processing device does not use pixels from multiple horizontal lines, then the overlap region may not be required.

The overlap regions 214 and 224 shared by format converters 234 and 244 as shown in FIG. 2, help to ensure that the output transition from one converter to the other is not visible when the processed active video of the top half interval 252 is combined with the processed active video lower half interval 262. Ideally, the overlap is at least as large as the size of the vertical filter (e.g. 3 taps) used the first format converters 234 and 244. If other types of multi-line processing apparatus are used in place of the format converters, the overlap region is desirably the number of lines that are concurrently processed by that apparatus.

Figure 3:
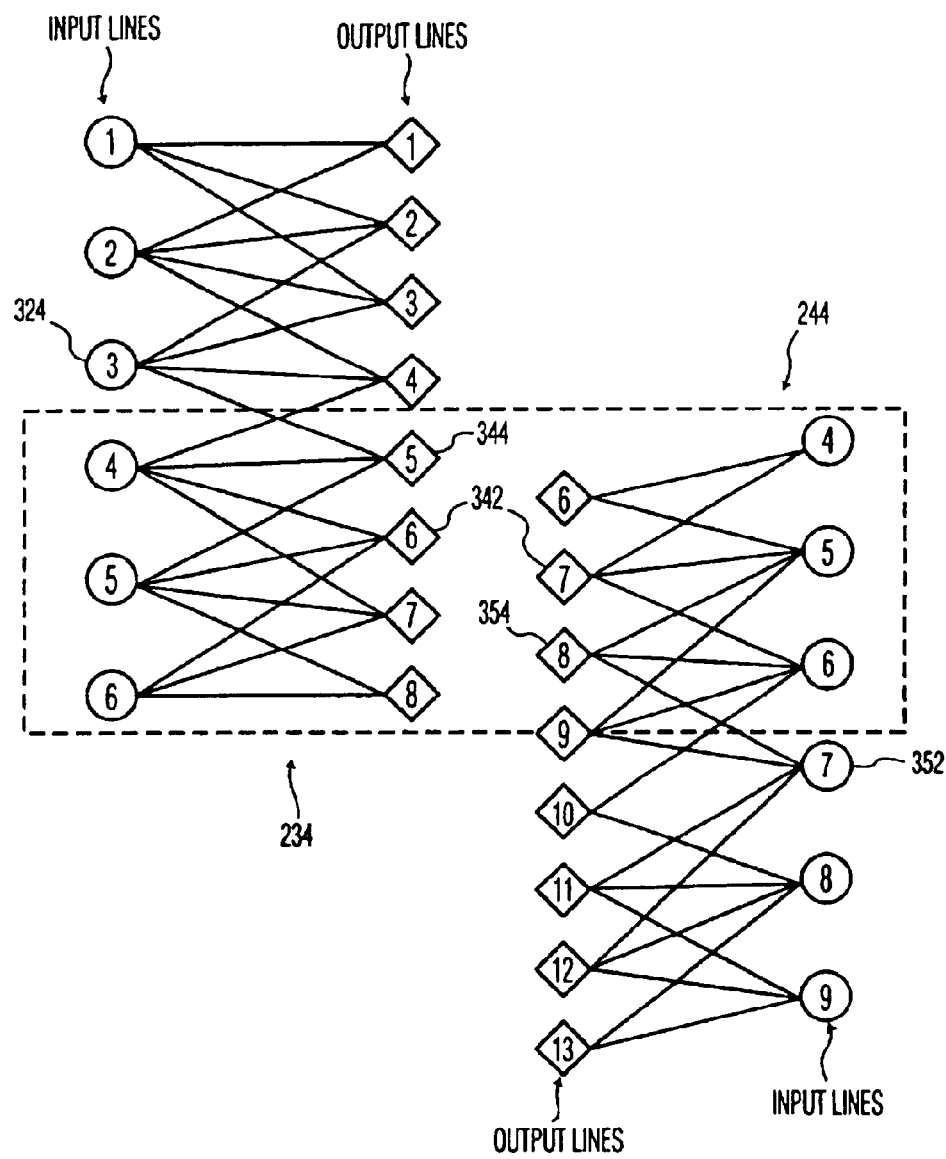
FIG. 3 is an interpolation diagram that is useful for describing the operation of the format conversion system in the overlap regions shown in the timing diagrams of FIG. 2.

FIG. 3 shows details of the overlap region between the first format converter 234 and the second format converter 244. For the convenience, the input image used in FIG. 3 has nine lines and the output image has 13 lines. Because the format converters 234 and 244 use three-tap vertical filters, the overlap region is set at three lines. The vertical filters of the format converters 234 and 244 in producing Line 6, 344 of the output signal 160 would ideally use line 3, 324 of the input signal 120. This line, however, is not available to the second converter 244. Likewise, in producing line 8, 354 of the output signal 160, the second format converter 244 would ideally use line 7, 352 of the input signal 120 as a tap; however, this line is not available to the first format converter 234. Only line 7, 342 of the output signal 160 is calculated identically by first format converter 234 and the second format converter 244. Consequently, the implementation of a crossover from the format converter 234 to the format converter 244 may be done seamlessly on line 7.

Figure 3A:
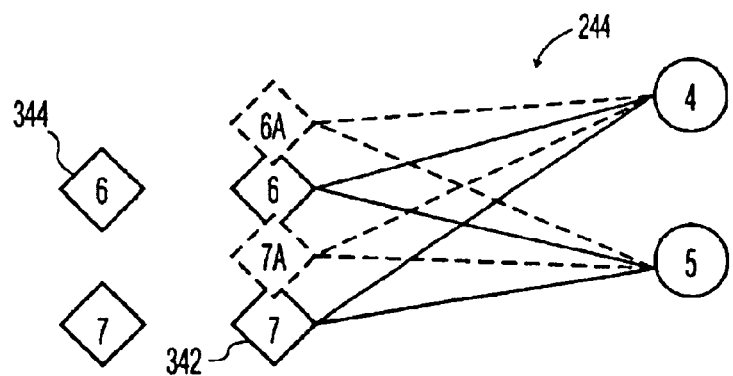
FIG. 3A is an interpolation diagram that shows details of the interpolation diagram shown in FIG. 3.

Of course in order to guarantee that the crossover is truly invisible, both format converter 234 and 244 desirably have the same phase relationship between input and output lines within the overlap region. With reference to the second criterion, described above, in which format converters 234 and 244 have a programmable starting phase, the exemplary format converters 234 and 244 have the capability to start their internal vertical filters at an arbitrary phase that may be set by a user. FIG. 3A is a close-up view of a portion of FIG. 3 that illustrates the reason for the second criterion. In the example, a nine line to thirteen line interpolation is being performed. In this example there are eight line steps at the input and twelve line steps at the output providing an interpolation ratio of two-thirds. This means that there are three possible phase relationships for an output line. The first phase has the output line co-sited with an input line, the second phase has the output line one-third of the way from the previous input line to the next, and the third phase has the output line two-thirds of the way from the previous input line to the next.

Referring to FIG. 2, the first format converter 234 has a starting phase of zero because the input and output lines are co-sited at the start. As shown in FIG. 3A, if the second format converter 244 were to have a starting phase of zero, its output lines would be located as shown by the diamonds 6A and 7A. These lines would not be properly aligned with the output signal 250 of the format converter 234. Instead, the starting phase of the format converter 244 is set to be one-third which lines up the output lines, 6, 7 and 8 of the output signal 260 with lines 6, 7 and 8 in the output signal 250 produced by the format converter 234.

While the invention has been described in terms of a hardware embodiment, it is contemplated that it may be implemented using computer program instructions that control a computer. These computer program instructions may be embodied in a computer-readable carrier such as an integrated circuit, a memory card, a magnetic or optical disk or an optical, radio-frequency or audio-frequency carrier wave.

Many modifications and variations of the present invention are possible in light of the above teaching. It is therefore to be understood that within the scope of the appended claims, the invention may be practiced otherwise than as specifically described.

What is claimed:

1. Apparatus for processing a first video signal having successive video images to produce a second video signal having respective successive video images:

a formatter coupled to receive a first video signal and configured to divide each video image into a plurality of parts each part including an active video portion and a vertical blanking portion;

a plurality of processors coupled to receive respectively different ones of the parts of the video images from said formatter, to begin processing the received parts as soon as the entire part has been received and to provide respective processed parts with a predetermined delay; and a multiplexer coupled to the plurality of processors for combining the processed parts to provide the second video signal, wherein the second video signal is delayed with respect to the first video signal by an interval substantially equal to the predetermined delay plus an amount of time represented by the active video portion of one of the plurality of parts.

2. Apparatus for converting a first video signal having successive video images in a first format to a second video signal in a second format comprising:

a formatter coupled to receive a first video signal and configured to divide each video image into a plurality of parts, each part including at least a portion of a vertical blanking interval;

a plurality of format converters coupled to receive respectively different ones of the parts of the video images from said formatter and to provide respective converted parts of video images in the second format; and a multiplexer coupled to the plurality of format converters for combining the converted parts to provide the second video signal.

3. Apparatus in accordance with claim 2 wherein the plurality of parts is two parts and each said two parts comprises the portion of the vertical blanking interval, an active video portion and an overlap portion which includes video signal information that is also in the other one of the two parts.

4. Apparatus in accordance with claim 3 wherein each of the format converters includes a vertical filter having a predetermined kernel size and the amount of video information in the overlap portion is determined by the kernel size of the vertical filter.

5. Apparatus in accordance with claim 2 further including a controller that controls each of said plurality of converters to process the respective part of the image of the first video signal independently of the processing of any other part of the first image of the first video signal.

6. Apparatus in accordance with claim 5 wherein the controller adjusts a start phase of said each of the plurality of converters except for the first converter to match an end phase of a previous one of said plurality of converters.

7. Apparatus in accordance with claim 2 wherein the formatter loads each of said plurality of converters in sequence with a respective one of the parts of each video image.

8. A circuit for reducing the delay of converting video signal in a first format defined as a sequence of interlaced video fields to a video signal in a second format comprising:

an input formatter connected to receive the video signal in the first format for dividing each active video field thereof into an active video top half field and an active video bottom half field;

a first format converter coupled to receive the active video top half field for converting the active video top half field into the second format;

a second format converter coupled to receive the active video bottom half field for converting the active video bottom half field into the second format; and a multiplexer connected to the first format converter and the second format converter for combining the active video top half field in the second format with the active video bottom half field in the second format to produce the video signal in the second format, delayed by approximately three-quarters of one frame interval relative to the first video signal.

9. A method for processing a first video signal having successive video images to produce a second video signal having respective successive video images, including the steps of:

dividing each video image into a plurality of parts each part including an active video portion and a vertical blanking portion;

processing each of the parts of at least one of the video images as soon as the entire part has been received to provide respective processed parts with a predetermined delay relative to when the respective part was received; and combining the processed parts to provide the second video signal, wherein the second video signal is delayed with respect to the first video signal by an interval substantially equal to the predetermined delay plus an amount of time represented by the active video portion of one of the plurality of parts.

10. A method in accordance with claim 9, wherein the step of processing each of the parts of at least one of the video images includes concurrently processing a predetermined number of lines of the part, whereby the step of processing defines a predetermined number of phases, wherein the step of processing further includes the step of adjusting the processing phase of each part except a first part to match an ending processing phase of a previous part.

11. A method for converting a video signal from a first format defined as a sequence of interlaced video fields to a video signal in a second format with a reduced delay comprising the steps of:

dividing each active video field into two portions to sequentially provide an active video top half field and an active video bottom half field;

converting the active video top half field into the second format as soon as the video top-half field is provided to provide a converted video top half field;

converting the active video bottom half field into the second format as soon as the video bottom half field is provided to provide a converted video bottom half field; and combining the converted video top half field with the converted video bottom half field to produce a field of the video signal in the second format delayed by approximately three-quarters of one frame interval relative to the first video signal.

12. A method in accordance with claim 11, wherein the steps of converting the active video top half field and of converting the active video bottom half field each includes concurrently processing a predetermined number of lines of the respective top half field and bottom half field, whereby the step of converting defines a predetermined number of phases, wherein the step of converting the active video bottom half field further includes the step of adjusting the phase with which the bottom half field is converted to match an ending processing phase of the top half field.

13. A computer readable carrier including computer program instructions that cause a computer to perform a method for converting a video signal from a first format defined as a sequence of interlaced video fields to a video signal in a second format with a reduced delay comprising the steps of:

dividing each active video field into two portions to sequentially provide an active video top half field and an active video bottom half field;

converting the active video top half field into the second format as soon as the video top-half field is provided to provide a converted video top half field;

converting the active video bottom half field into the second format as soon as the video bottom half field is provided to provide a converted video bottom half field; and combining the converted video top half field with the converted video bottom half field to produce a field of the video signal in the second format delayed by approximately three-quarters of one frame interval relative to the first video signal.

14. A computer readable carrier in accordance with claim 13, wherein the computer program instructions that cause the computer to perform the steps of converting the active video top half field and of converting the active video bottom half field includes computer program instructions that cause the computer to concurrently process a predetermined number of lines of the respective top half field and bottom half field, whereby the step of converting defines a predetermined number of phases, wherein the computer program instructions that cause the computer to perform the step of converting the active video bottom half field further include computer program instructions that cause the computer to adjust the phase with which the bottom half field is converted to match an ending processing phase of the top-half field.

* * * * *